United States Patent
Harboe et al.

(10) Patent No.: US 10,035,117 B2
(45) Date of Patent: Jul. 31, 2018

(54) MIXING DEVICE AND METHOD FOR A CLOSED RESIN INFUSION PROCESS

(71) Applicants: Niels Harboe, Hadsund (DK); Casper Houmann Jensen, Aalborg (DK)

(72) Inventors: Niels Harboe, Hadsund (DK); Casper Houmann Jensen, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 697 days.

(21) Appl. No.: 13/849,697

(22) Filed: Mar. 25, 2013

(65) Prior Publication Data

US 2013/0250714 A1    Sep. 26, 2013

(30) Foreign Application Priority Data

Mar. 26, 2012  (EP) .................................. 12161267

(51) Int. Cl.
| | | |
|---|---|---|
| *B01F 5/00* | (2006.01) | |
| *B01F 15/06* | (2006.01) | |
| *B01F 15/02* | (2006.01) | |
| *B29B 7/74* | (2006.01) | |
| *B29B 7/80* | (2006.01) | |

(52) U.S. Cl.
CPC .......... *B01F 15/026* (2013.01); *B01F 5/0077* (2013.01); *B29B 7/7457* (2013.01); *B29B 7/801* (2013.01); *B29B 7/802* (2013.01)

(58) Field of Classification Search
CPC ...... B01F 15/026; B01F 5/0077; B01F 5/008; B29B 7/7457; B29B 7/802; B29B 7/801
USPC ..................................... 366/162.4–162.5, 189
See application file for complete search history.

(56) References Cited

U.S. PATENT DOCUMENTS

| | | | | |
|---|---|---|---|---|
| 1,836,329 A | * | 12/1931 | Lombard ............ | B01F 3/04787 261/75 |
| 2,332,995 A | * | 10/1943 | Eaton ................... | B01F 5/0077 137/607 |
| 2,459,048 A | * | 1/1949 | Schwartz ............ | B29C 45/1603 222/132 |
| 2,569,857 A | * | 10/1951 | Jaegle .................. | B01F 5/0413 137/515.5 |
| 2,850,036 A | * | 9/1958 | Hilkemeier .......... | B01F 5/0077 137/266 |

(Continued)

FOREIGN PATENT DOCUMENTS

| | | | | |
|---|---|---|---|---|
| CN | 1681630 A | | 10/2005 | |
| DE | 2347516 A1 | * | 3/1975 | ............ B01F 5/0077 |

(Continued)

OTHER PUBLICATIONS

Machine translation of DE 19624229, obtained May 18, 2017 from EPO.*

*Primary Examiner* — Charles E Cooley

(57) ABSTRACT

A mixing device is provided for a closed resin infusion process. The mixing device includes a bulk mixing head with a mixing cavity, at least two separate non-return valves for opening and closing a respective channel for providing material to be mixed running into the mixing cavity. A removable flange is provided for closing the mixing cavity comprising a fitting for mounting the mixing device to a static mixer. At least one heating element is provided for curing the hardable material mixture in the mixing cavity if need be.

9 Claims, 1 Drawing Sheet

(56) References Cited

U.S. PATENT DOCUMENTS

| | | | | |
|---|---|---|---|---|
| 3,051,455 A * | 8/1962 | Magester | B01F 5/0656 | 366/159.1 |
| 3,220,801 A * | 11/1965 | Rill, Jr. | B29B 7/404 | 366/182.4 |
| 3,583,439 A * | 6/1971 | Dolenz | B29B 7/603 | 137/605 |
| 3,709,468 A * | 1/1973 | Ives | B29B 7/7457 | 366/339 |
| 3,741,441 A * | 6/1973 | Eberle | B29B 7/748 | 222/135 |
| 3,771,963 A * | 11/1973 | Breer | B29B 7/7457 | 366/604 |
| 3,788,337 A * | 1/1974 | Breer | B29B 7/7615 | 137/1 |
| 3,917,756 A * | 11/1975 | Rice | B01F 5/08 | 239/432 |
| 3,936,036 A * | 2/1976 | Fries | B29C 33/0077 | 366/162.4 |
| 4,073,664 A | 2/1978 | Zwirlein | | |
| 4,092,118 A * | 5/1978 | Muhle | B29B 7/7615 | 366/162.5 |
| 4,099,904 A * | 7/1978 | Dawson | B29C 45/23 | 251/31 |
| 4,115,066 A * | 9/1978 | Muhle | B29B 7/7663 | 239/586 |
| 4,171,163 A * | 10/1979 | Hawkins | B29B 7/7615 | 366/145 |
| 4,193,701 A * | 3/1980 | Koch | B29B 7/7668 | 366/159.1 |
| 4,223,811 A * | 9/1980 | Czegledi | B29B 7/7615 | 137/563 |
| 4,304,537 A * | 12/1981 | Kirjavainen | B29C 44/322 | 264/171.14 |
| 4,397,407 A * | 8/1983 | Skoupi | B29B 7/7631 | 366/162.4 |
| 4,459,029 A * | 7/1984 | Veyriere | B05B 7/04 | 366/138 |
| 4,479,048 A * | 10/1984 | Kinoshita | B29B 17/00 | 165/87 |
| 4,523,696 A * | 6/1985 | Commette | B05B 15/0233 | 222/135 |
| 4,549,676 A * | 10/1985 | Gerich | B29B 7/7438 | 222/145.6 |
| 4,600,312 A * | 7/1986 | Scrivo | B29B 7/7663 | 137/625.4 |
| 4,834,545 A * | 5/1989 | Inoue | B01F 7/00816 | 222/135 |
| 5,067,886 A * | 11/1991 | Salaba | B29B 7/76 | 422/131 |
| 5,226,450 A * | 7/1993 | Lambourn | B01F 5/0077 | 137/607 |
| 6,375,096 B1 | 4/2002 | Rashidi | | |
| 6,929,153 B1 * | 8/2005 | Gerich | B01F 5/0077 | 222/135 |
| 7,754,075 B2 * | 7/2010 | Richardson | G01N 30/32 | 137/606 |
| 2002/0145937 A1 * | 10/2002 | Chen | B01F 15/00123 | 366/162.5 |
| 2002/0176317 A1 * | 11/2002 | Bellasalma | B01F 15/0201 | 366/182.4 |
| 2013/0250714 A1 * | 9/2013 | Harboe | B29B 7/7457 | 366/144 |

FOREIGN PATENT DOCUMENTS

| | | | | |
|---|---|---|---|---|
| DE | 2524456 A1 * | 12/1976 | | B01F 5/0451 |
| DE | 19624229 A1 * | 1/1998 | | A21C 1/1425 |
| FR | 1479496 A | 5/1967 | | |
| GB | 996325 A * | 6/1965 | | A01C 23/042 |
| GB | 1462603 A * | 1/1977 | | B01F 5/0077 |
| JP | 63-270110 | * 11/1988 | | |
| JP | 8020053 A | 1/1996 | | |

* cited by examiner

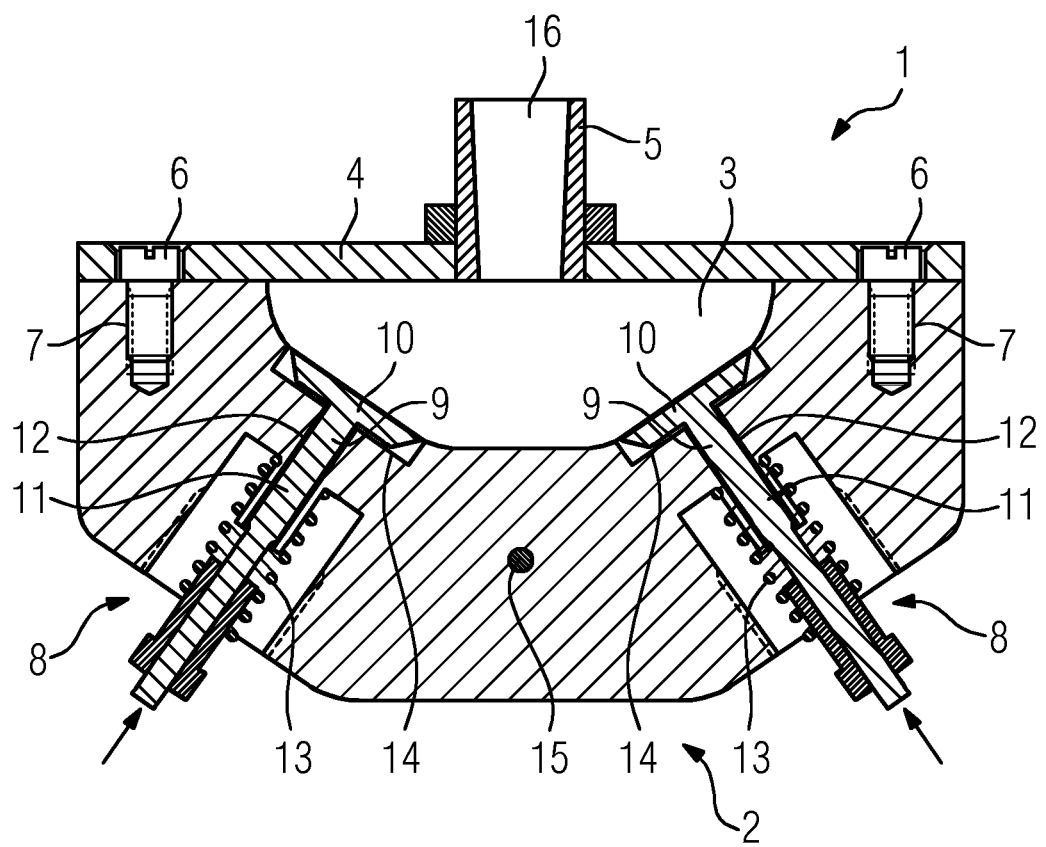

MIXING DEVICE AND METHOD FOR A CLOSED RESIN INFUSION PROCESS

CROSS REFERENCE TO RELATED APPLICATIONS

This application claims priority of European Patent Office application No. 12161267.5 EP filed Mar. 26, 2012. All of the applications are incorporated by reference herein in their entirety.

FIELD OF INVENTION

Embodiments illustrated herein relate to a mixing device for a closed resin infusion process.

BACKGROUND OF INVENTION

Such mixing devices are used in the manufacturing of multi component composite items. A known mixing device comprises mixing head with two non-return valves in separate inserts for closing and opening respective cavities or channels running to a mixing cavity. This mixing device is mounted to another appliance like a static mixer or the like where the mixed resin is further process.

The known mixing device faces a problem when cleaning is needed. Cleaning is either performed by filling in a cleaning shot thereby emptying the mixing device. The mixing device is flushed with the cleaning shot, the resin contained in the mixing device is spilled out of the device. Alternatively it is known to disconnect the mixing device from the following system before the curing of the resin takes place and to use a bucket or the like for spilling in the resin. Both alternatives bear problems. When using a cleaning shot it is not ascertained that all of the resin is completely flushed out of the mixing head. Especially in corners of the channels or the mixing cavity residual resin may remain. Demounting the mixing head is very cumbersome and somehow risky because the resin is still liquid and may spill out uncontrolled.

SUMMARY OF INVENTION

It is an object herein to provide a mixing device which is more easy to clean than known mixing devices.

For solving the problem the illustrated embodiments provide a mixing device for a closed resin infusion process, comprising a bulk mixing head with a mixing cavity, at least two separate non-return valves for opening and closing a respective channel for providing material to be mixed running into the cavity, a removable flange for closing the cavity comprising a fitting for mounting the device to a static mixer, and a heating element arranged in the mixing head for curing the hardable material mixture in the cavity if need be.

The new mixing device utilizes two integrated non-return valves for separating the resin from the hardener at all times. The valves are integrated directly into the mixing head or the flange and not into separate inserts as known in the prior art. The direct integration makes it simpler to maintain the valves and is inexpensive as well.

Furthermore a removable flange is provided for closing the mixing cavity. For cleaning the mixing head the flange is easy to remove, so that the mixing cavity can be opened Finally a heating element is arranged in the mixing head. This heating element is used for curing the hardable material mixture in the cavity, if the same is to be clean.

After the infusion/injection is finish the mixing cavity is still filled with resin and hardener, both being separately provided to the respective channels opened and closed via the separate valves. When the mixing head is to be cleaned the heating element is turned on for heating the mixing head and thus heating and curing the material mixture in the cavity fast. After curing the material mixture for a certain time it is ascertained that no more liquid mixture is present in the cavity. Now the mixing device can be removed from the static mixer, and the flange removed for opening the mixing cavity. This is done manually. The mixing cavity is filled with hardened material mixture, which can now be taken out of the cavity as a cured bulk. When the cavity is empty the mixing head is ready to be used again. It is only necessary to mount the flange again, which is also cleaned from any residual cured bulk material before remounting it. Now the mixing device can be remounted to the static mixer for the next infusion process.

As explained above the two non-return valves are provided directly in the mixing head or the flange. They are used to open and close respective channels running into the mixing cavity. To arrange the mixing device as compact as possible the valves are arranged with their closing means directly in the cavity. For accommodating the closing means the cavity is provided with two recesses into which the plate like closing means engage in the closing position of the respective valve. It is desirable if the respective plate like closing means almost completely fills the respective recess, so that they are arranged as flush mounted parts. The bulk material can easily be pulled out of the opened mixing cavity.

For directly inserting and guiding the respective valves in the mixing head or the flange it is desirable that the valves have a T-shaped cross section and are each biased by means of a spring arranged at the mixing head or the flange. Each T-shaped valve is directly guided in a linear guiding channel of the mixing head or the flange and is biased by means of a spring. A respective actuating means pushes the T-shaped valve for opening the valve, thereby compressing the spring, which returns the respective T-shaped valve in the closing position when the actuating means is turned off.

According to a one embodiment, the mixing cavity has only positive slip angles. This means that the mixing cavity opens without any recesses or negative slip angles to the flange plate. This makes it possible to easily take out the cured bulk material after curing by heating with the heating element. Since there are no negative slip angles respectively any recesses which might clamp the cured bulk the bulk material can easily be taken out of the cavity manually. In combination with the flushed mounted valve it is possible to remove the cured bulk epoxy very simple and easily.

As explained above the removable flange comprises a fitting for mounting the mixing device to a static mixer. This fitting is also filled with the material mixture when the infusion respectively injection is performed. After finishing the infusion or injection and curing the material in the mixing head also the material in the fitting is cured. For easily cleaning the flange respectively the fitting the central opening of the fitting has a cone shape having it's smaller diameter at the end next to the cavity. A cone shape makes it easy to take the cured bulk material out of the central opening.

Finally the heating element is, for example, a resistance heating element. It is certainly possible to mount more than one heating element, especially when the mixing cavity is larger.

DETAILED DESCRIPTION OF INVENTION

Further features and advantages of the illustrated embodiments will be explained with references to the drawing.

The FIGURE shows a mixing device 1 comprising a mixing head 2 having a mixing cavity 3. The mixing cavity is closed by means of a removable flange 4 with a fitting 5 for mounting the mixing device to a static mixer. The flange 4 is fixed to the mixing head with several screws 6 being screwed into respective bores 7 of the mixing head.

Furthermore the mixing head comprises two non-return valves 8 being directly mounted in the mixing head 2. Each non-return valve comprises a valve body 9 having a T-shaped cross section with a plate like closing means 10 and a rod 11 being guided in a respective linear guiding bore 12 of the mixing head 2. The valve body 9 is biased by means of a spring 13 which urges the respective plate like closing means into the closing position, in which it engages a recess 14 provided in the mixing head 2 directly in the mixing cavity 3. As the FIGURE shows the plate like closing means are flush accommodated in a recesses 14, so that there is no recess or the like at the wall of the mixing cavity 3 when the valves are closed.

For opening the respective valves 8 it is necessary to press the valve head 9 by means of a not shown actuating means into the mixing head 2 against the respective spring 13, which is compressed, while the plate like closing means are pushed out of the recess 14, thereby opening a not shown channel running into the mixing cavity 3, through which channels the respective materials to be mixed in the cavity 3 are provided.

As shown in the FIGURE the cavity 3 has a form having only positive slip angles. The cavity has no recesses or the like respectively no negative slip angles to the flange plate 4. This makes it possible to easily take out a cured bulk material for cleaning the mixing device 1.

Furthermore a heating element 15 is provided in the mixing head 2 for heating the mixing head 2 and especially for heating and curing the hardable material mixture remaining in the cavity 3 and the central opening 16 of the fitting 5 of the flange. The heating element 15 is, for example, a resistance heating element and is designed to rapidly heat the mixing head 2 respectively the material mixture in a cavity 3 and the opening 5. After finishing the heat treatment the whole material in the cavity 3 and the opening 5 is hardened and cured, no more liquid material is present. After this it is easily possible to clean the mixing device 1. If the mixing device is still mounted to the static mixer, it with be removed for cleaning purpose. The screws 6 are opened. Now the flange 4 is removed. As the FIGURE shows the central opening 16 has a cone like cross section, it opens to the outside. Thus when lifting the flange 4 from the mixing head 2 also the cured bulk material is lifted, that means, that the cured bulk material in the cavity 3 is also taken out of the cavity 3 when the flange 4 is lifted. In case that the connection between the bulk material in the cavity 3 and the opening 5 is not stiff enough to move the cured material completely out of the cavity 3, the connection will brake when lifting the flange 4. Still it is easily possible to remove the cured bulk material from the cavity 3 due to the positive slip angles. The hardened material in the opening 5 can easily be removed due to the cone shape of the opening.

After removing the bulk material the flange 4 is remounted again to the mixing head 2, the mixing device 1 can be used again.

Although the embodiment shown in the accompanying FIGURE shows only one heating element 15 it is clear that two or more heating elements 15 can be provided.

It is also possible to provide more than two non-return valves 8, allowing to forward more than two materials to be mixed into the mixing cavity 3.

Finally it is possible to integrate the respective non-return valves 8 into the flange 4 instead of the mixing head 2. In this case the flange 4 is provided with respective recesses for accommodating the closing bodies of the respective valve elements and with the respective linear guiding bore etc. Nevertheless it is sometimes desirable to integrate the valves directly into the mixing head.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A method of a closed resin infusion process, comprising:
   providing a mixing device for a closed resin infusion process, comprising:
   a bulk mixing head comprising a heating element and a mixing cavity, the mixing cavity delineated by a first section and a second section;
   a plurality of recesses formed in the mixing cavity; and
   at least two separate non-return valves, each of the non-return valves comprises a closing device arranged in a recess of the mixing cavity, the closing device movable between an open position, effective for opening a respective channel for providing material to be mixed into the mixing cavity, and a closed position, effective for closing the respective channel, the closing device fits into the respective recess and is flush relative to the surface of the mixing cavity during the closed position,
   for each non-return valve:
     setting the respective valve to the open position and injecting the material into the cavity by way of the channel formed in the respective non-return valve, and
     closing the respective valve to the closed position;
   the heating element effective for curing the injected material in the mixing cavity to form a cured material, and
   the second section being a removable flange configured to be detachable from the first section allowing access to the cured material in at least a portion of the cavity;
   removing the removable flange; and
   removing the cured material from at least a portion of the mixing cavity.

2. The method according to claim 1, wherein respective closing devices of the non-return valves comprise a plate almost completely filling the recess during the closed position.

3. The method according to claim 1, wherein the valves have a T-shaped cross section and being biased via a spring.

4. The method according to claim 1, wherein the mixing cavity has only positive slip angles.

5. The method according to claim 1, wherein the heating element is a resistance heating element.

6. The method according to claim 1, wherein the flange is a plate.

7. The method according to claim 6, wherein the plate is secured to the first section by screws.

8. The mixing device according to claim 1, wherein the bulk mixing head comprising a fitting for mounting the mixing device to a static mixer.

9. The method according to claim 8, wherein the fitting has an elongated channel having a conical shape and converging to a smaller diameter end adjacent to the mixing cavity.

* * * * *